US012587570B2

(12) United States Patent
Renda et al.

(10) Patent No.: US 12,587,570 B2
(45) Date of Patent: Mar. 24, 2026

(54) POLICY-AS-CODE FOR DATA ASSETS AND REMEDIATION IN CLOUD ENVIRONMENTS

(71) Applicant: Amazon Technologies, Inc., Reno, NV (US)

(72) Inventors: Scott Renda, Seattle, WA (US); Aleatha Parker-Wood, Palo Alto, CA (US); Amandeep Khurana, Burlingame, CA (US); Jai Prakash Chabria, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 207 days.

(21) Appl. No.: 18/372,390

(22) Filed: Sep. 25, 2023

(65) Prior Publication Data

US 2025/0106257 A1     Mar. 27, 2025

(51) Int. Cl.
*H04L 9/40*          (2022.01)

(52) U.S. Cl.
CPC .............. *H04L 63/20* (2013.01); *H04L 63/10* (2013.01)

(58) Field of Classification Search
CPC ................................ H04L 63/10; H04L 63/20
See application file for complete search history.

(56) References Cited

U.S. PATENT DOCUMENTS

| | | | |
|---|---|---|---|
| 11,936,692 B1 * | 3/2024 | Gavish | ................... H04L 63/20 |
| 2020/0356536 A1 | 11/2020 | Nilsson | |
| 2023/0136439 A1 | 5/2023 | Anctil et al. | |

OTHER PUBLICATIONS

International Search Report and Written Opinion issued in corresponding PCT Application No. PCT/US2024/047547, dated Dec. 20, 2024, 9 pages.

* cited by examiner

*Primary Examiner* — Pramila Parthasarathy
(74) *Attorney, Agent, or Firm* — Hogan Lovells US LLP

(57)          ABSTRACT
A system and supporting method enable receipt of a computer-coded policy for execution in a control plane associated with a cloud environment to provide data governance in a data plane using one or more data assets of the cloud environment, where the one or more data assets are automatically associated to the computer-coded policy using a set of pre-determined rules associated with the computer-coded policy and using annotations associated with the one or more data assets, and where dynamic changes are to be performed with respect to the annotations based in part on real-time changes to the computer-coded policy to allow monitoring contents of the one or more data assets in accordance with the computer-coded policy and to perform a remediation action that is associated with the one or more data assets in response to a violation associated with the computer-coded policy.

20 Claims, 7 Drawing Sheets

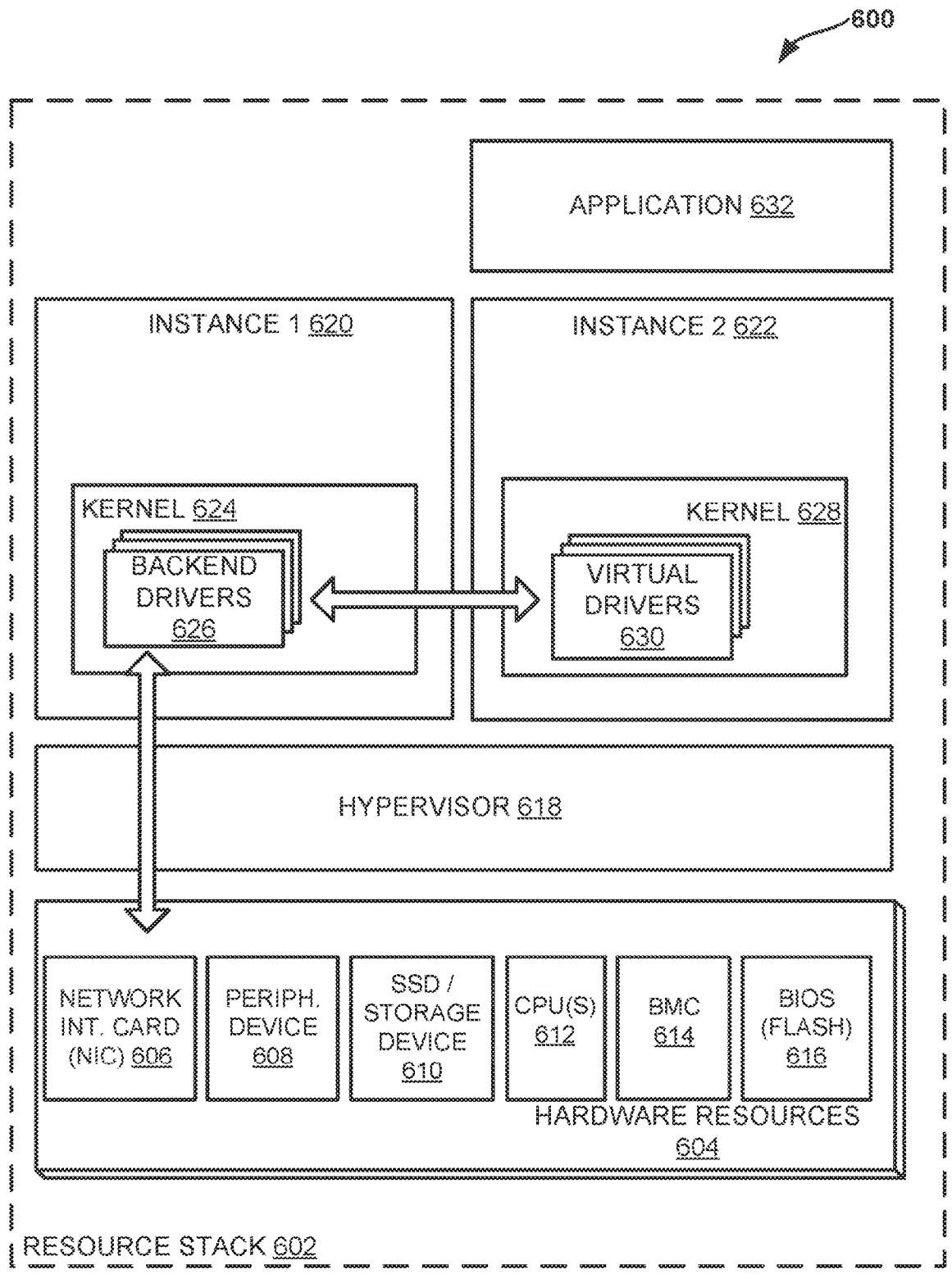
FIG. 6 —Prior Art—

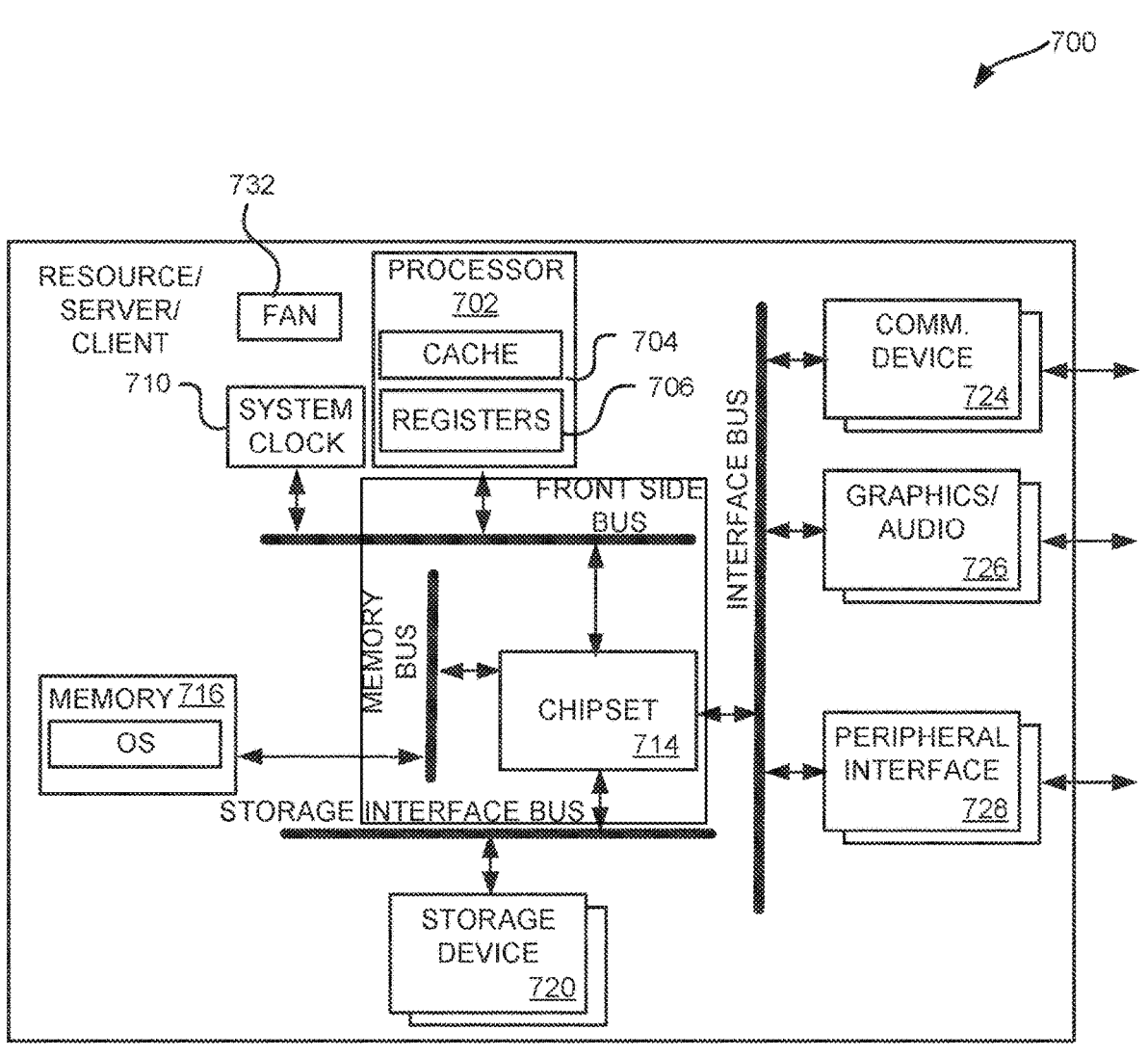
FIG. 7 —Prior Art—

POLICY-AS-CODE FOR DATA ASSETS AND REMEDIATION IN CLOUD ENVIRONMENTS

BACKGROUND

A data producer and a data consumer may be supported by an intermediate data governance feature composed of hardware and software in a cloud environment. The data producer may be an aggregator of data from different sources and accounts and may be a provider of such data to be used by the data consumer for services, such as marketing and analytics, for an end user or client. A data domain of the intermediate data governance feature allows data producers to catalog data with business contexts, such as sales, marketing, quality, and other contexts. The data domains may support certain policies therein to provide the data governance, and may support sub-domains to the categories or the end user or clients for implementation of the policies. The data that is subject to the policies may be referred by their data asset, which may be a representation of metadata for the data, including table names, column names, column types, aliases, business descriptions, classifications, and the like. The data itself may be presented as data objects, such as a table, a dashboard, a file, or for a virtual data object. However, such a policy implementation remains devoid of support for a centralized capability to orchestrate, manage and monitor data policies and data lifecycle actions. For example, such a policy implementation may not fully support policy compliance of different asset types, invoking of correct data lifecycle actions, and reporting to dashboards that can link data management tasks to compliance.

BRIEF DESCRIPTION OF THE DRAWINGS

Embodiments herein will be described with reference to the drawings, in which:

FIG. 6 illustrates example components of a server that can be utilized to perform at least a portion of a remediation action in response to a violation associated with a computer-coded policy, in accordance with various embodiments.

FIG. 7 illustrates example components of a computing device that can be used to implement input, processing, monitoring, and other aspects of various embodiments.

DETAILED DESCRIPTION

Figure 1:
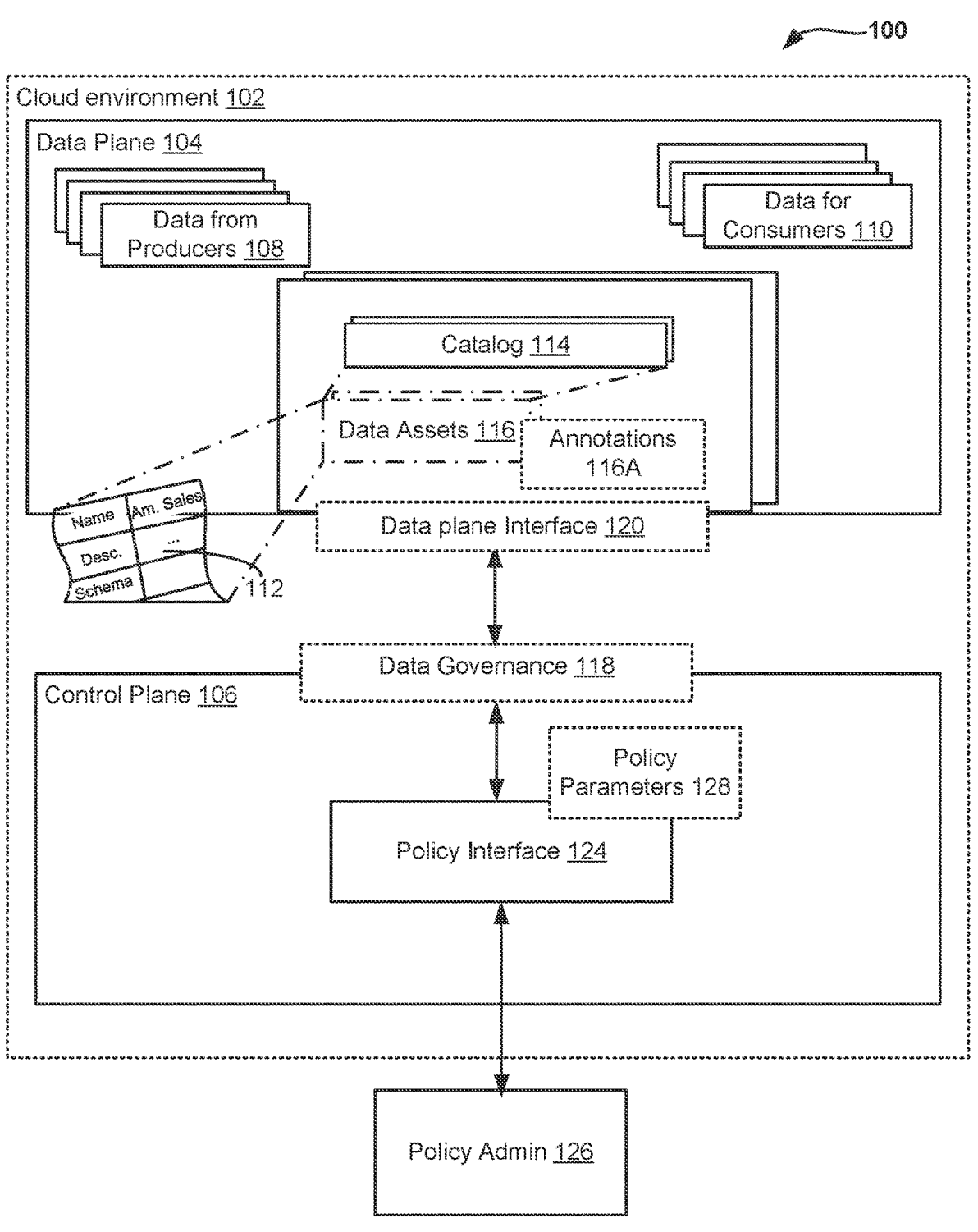
FIG. 1 illustrates a block diagram of a system to perform a remediation action in response to a violation associated with a computer-coded policy, in accordance with at least one embodiment.

Systems and methods in accordance with at least one embodiment described herein can overcome one or more of the aforementioned deficiencies, and other such deficiencies, in approaches to data governance using code, referred to herein as "policy as code," to provide the ability for a control plane to engage in dynamic and real-time data governance for a data plane. In at least one embodiment, such a system includes at least one processor to execute instructions from a memory to cause the system to receive a computer-coded policy for execution in a control plane associated with a cloud environment. The computer-coded policy can be associated with the data governance in a data plane using one or more data assets of the cloud environment. The system is caused to automatically associate the one or more data assets to the computer-coded policy. For example, the system can use pre-determined rules associated with the computer-coded policy as well as annotations associated with the one or more data assets. Such a system can support dynamic changes to the one or more data assets based in part on real-time changes to the computer-coded policy. Such a system can also include monitoring capability for the one or more data assets, in accordance with the computer-coded policy. The system can perform a remediation action associated with the one or more data assets in response to a violation associated with the computer-coded policy.

In at least one embodiment, such an approach for dynamic and real-time data governance provides capability, in a cloud environment, to simplify compliance with policy, including with data privacy regulations throughout a lifecycle of the data. The computer-coded policy of the system expands the dynamic and real-time data governance features herein to allow for authored computer-coded policies to govern the data, to monitor for policy compliance, and to take remediation actions, which can all include dynamic and real-time data responses over the lifecycle of the data. As computer-coded policies are defined, the system for dynamic and real-time data governance can automatically match policy parameters of the computer-coded policies by execution in a cloud environment to determine data assets in a data plane and to invoke tests, including user-defined tests, and actions to monitor and remediate identified issues. This system benefits from built-in reporting that provides a consolidated view of a compliance posture of the data assets of a data consumer, for instance. Further, to support the policy-as-code approaches herein, templates for one or more of retention rules, deletion rules, data filtering rules, data disclosure rules (including data subject access requests), data sovereignty rules, or locality rules of such computer-coded policies are provided in computer-coded policy libraries to enable generation of variations of computer-coded policies to be executed in the cloud environment.

In at least one embodiment, the computer-coded policy provides a policy-as-code tool that enables a policy administrator to define data lifecycle policies that can be used to ensure compliance for data assets with respect to one or more policies, including data privacy regulations or requirements stemming from data sharing or commercial contracts. In at least one embodiment, the system and method herein support and build upon discovery, cataloging, collaboration, and access features for data using data domains and data assets within the data domains by computer-coded policies for execution in a control plane associated with a cloud environment, where the computer-coded policies are associated with data governance in a data plane using one or more data assets of a data plane. Therefore, computer-coded policies that may include retention rules and deletion rules can be applied to metadata associated with data assets, as policy parameters (such as, including retention periods providing the retention rules and deletion periods providing the deletion rules). The computer-coded policies are enforced for compliance by an enforcement and monitoring module that spans the control and data planes. As such, it is possible to automatically associate the one or more data assets to the computer-coded policy using pre-determined rules of the computer-coded policy and using annotations associated with the one or more data assets.

In at least one embodiment, a policy administrator can benefit from a testing capability that also allows real-time updates to computer-coded policies and to cause dynamic changes to the one or more data assets based in part on the real-time updates to the computer-coded policies. Further, it is possible to populate ready-made, reporting computer-coded templates that can be used for internal compliance processes. The system and method herein can address policy-based systems that may be devoid of a standardized workflow to provision and manage data policies for an entity, throughout the data lifecycle. This may include declarative actions, which may relate to how data is collected, stored, used, archived and disposed. Further, the system and method herein can be integrated with low-level components like compute, storage, and identity resources, as detailed further herein to provide reporting that is part of native analytics services. The approaches to perform a remediation action in response to a violation associated with a computer-coded policy allows data publishers or producers to associate policy to data assets without a need to understand how policies apply to the data asset and without a need to search thousands of datasets to discover relationships, which can be cumbersome and an error-prone process. Separately, a policy administrator or a data consumer may want to apply policies to data assets and can do so by the approaches herein. These approaches, using computer-coded policy removes requirements for written code only to implement tests and remediation steps that may not keep pace with evolution in a data landscape, with regulations change, and with new commercial contracts causing required changes to save data. Additionally, the approaches herein address issues where audit personnel may lack effective ways to review compliance posture and may depend on manual reporting by providing notification and reporting as part of changes that occur to a computer-coded policy or to a data asset.

FIG. 1 illustrates a block diagram 100 of an example system to perform a remediation action in response to a violation associated with a computer-coded policy, in accordance with at least one embodiment. The system includes at least one processor and memory having instructions that when executed by the at least one processor enables one or more of the modules and features 104-126 described herein. A policy administrator 126 may use an admin or administrator interface 126 of a service provider to provide a computer-coded policy that supports specific remediation approaches for one or more data assets. The use of a computer-coded policy that supports specific remediation approaches enables resilient workloads or applications for data consumers. Such remediation, for example, may include a requirement to provide computer-coded policies with an extensible policy language and to invoke certain data lifecycle actions for remediation. Further, such remediation may be associated with relationships yet to be determined between data policies, data stores, and datasets. In at least one embodiment, the system and method herein enable real-time and dynamic changes to the computer-coded policies and to the annotations, and are able to perform, based on the automatic association between the computer-coded policies and the data assets, monitoring as well as testing of contents of a data asset for remediation actions when a violation of a computer-coded policy occurs with respect to contents of a data asset.

A cloud environment 102 may include a data plane 104 and a control plane 106. A control plane 106 provides application programming interfaces (APIs) that may be associated with resources in the data plane 104. The resources may include computing assets that may be used to process or store data from producers 108 and to provide data for consumers 110. The resources created, updated, deleted, listed, or used in a manner suitable to the application. In one example, control plane actions may include launching of computing instances within a cloud environment 102, creation of storage services, and descriptions to service queues. Further, upon launching a computing instance, a control plane 106 may first perform tasks associated with determining a physical host having the capacity to perform the task, determining network interface allocation, preparing storage volume within the cloud environment 102, and generating secure access credentials. As such, a control plane 106 may implement a system of workflows, business logic, and databases. A data plane 104 provides the task or workload aspects or functions of a service associated with the control plane 106 and the data plane 104. In at least one embodiment, a data plane 104 may be used to perform a computing instance after creation by the control plane 106, may be used for reading and writing to storage volumes or cloud buckets, and may be used to perform routing of network queries and performing health checks.

In at least one embodiment, data domains may correspond to a virtual section of the data plane to which data producers can provide the aforementioned data from producers 108, to be cataloged with business contexts for an entity or organization. Therefore, in at least one embodiment, different entities in a cloud environment 102 can represent their own organizational hierarchy within one of the data domains. Further, some of the data domains may include sub-domains for subsidiaries or related entities, for instance. Different data domains may be associated with different data (such as data from producers 108) that may reside in any account or region. In an example, such data from producers 108 may be associated with multiple sources for a data publisher of an entity, such as the aforementioned accounts or regions. The data publisher or producer can publish data assets 116 to a catalog 114 for the data that is also stored in the cloud environment 102 and that belongs to one or more data producers. A catalog 114, which is detailed further subsequently herein, may be a data structure that may provide context to the data as part of the data domains. For example, data from producers 108 for a business may be separated into corporate and other data, where the corporate data may be further cataloged to sales, finance, marketing, and the like.

In each of such cataloged separations, organizational domains may be defined as the highest level of the catalog, followed by business glossaries, which may be further associated with metadata as a sub-category, and which is, in turn, associated with a finest granularity, which are data assets 116. Therefore, the data from producers 108, for one entity, may be cataloged to such separations. For example, an entity may have organizational domains for sales, finance, and marketing, as noted above, which may be further sub-cataloged to business glossaries. Business glossaries, for sales, may pertain to sales in different geographical regions; whereas, for finance, may pertain to different financial assets. Then, a metadata sub-category for the sales as a business glossary may pertain to different sales forms, from different geographical regions; or, for finance as a business glossary, may pertain to specific financial forms of the different financial assets. Then, data assets as the finest sub-category under the sales metadata, provides certain sales or product tables of the different sales forms; or, for finance metadata, provides certain financial tables of the different financial forms.

In at least one embodiment, therefore, data assets 116 may be tables, files, dashboards, and the like, which may reference aspects of the data from producers 108 that can be cataloged as within the data domains. These data assets 116 may include contents 112, such as a table name, a table description, and a schema (such as, column name, column types, column descriptions and the like) that are subject to monitoring to determine compliance to the computer-coded policies. The data assets 116 may be associated with extensible business metadata, such as business descriptions, business aliases, sensitivity of the data, classification of the data, and the like. The metadata sub-catalog, also referred to as metadata forms, provide an onboarding or intake form that can be used to set up recommended or required fields. This is to allow data producers or publishers of different regions and accounts to publish to the catalog in a consistent format. The data producers or publishers may follow recommended or required fields that may additionally be associated with recommended values in a template to publish their data.

In at least one embodiment, for an organizational domain associated with sales, the metadata may be set up to ensure that different sales regions can provide any data asset into the catalog 114. Thereafter, data from producers 108 may include their respective attributes, including sales values, sales quarters, and the like. To ensure consistency in the values and the metadata, as well as the data asset, the values are separated into different columns in the metadata form and the data asset, where some of the columns may be sensitive relate to other columns. In at least one embodiment, the system and method herein support discovery of data from producers 108, which subsequently enables data consumers to search for and easily locate data assets 116 in which they are interested, and which can then be provided as data for consumers 110.

In at least one embodiment, one or more projects of the data domains may be provided to bring together the data from producers 108 and the data for consumers 110 using computer-coded policies from a policy interface 124 of the control plane 106. Each of the projects enable a group of users, such as webservice customers 222 (in FIG. 2, who may be data consumers) and data owners 218 (who may be data producers) to collaborate for business or other requirements, where such collaboration may include publishing, discovering, subscribing to, and consuming data assets 116 of a catalog 114. In at least one embodiment, each of the projects may be associated with access controls from a data governance module 118 of a control plane 106. The access controls may be applied so that authorized individuals, groups, and roles can access an underlying project, and, in turn, the underlying data assets of the project. Further, the access controls can also ensure that only those tools that are defined by permissions for the project can be used with the underlying data assets, for instance. In at least one embodiment, a project can act as an identity principal that receives access grants to underlying resources associated with the data asset and can enable a catalog to operate within computing assets or infrastructure associated with the pertinent data from producers 108 of the data asset, without relying on further individual user's credentials.

In at least one embodiment, each of such projects may be used to manage data access for teams and groups. For example, at least one project may be subject to internal access controls so that only authorized individuals, groups, and roles can access the project and its data assets and so that only tools (or capabilities) configured in the project can be used with it. Further, project profiles may be defined as pre-configured sets of resources and capabilities that provide a reusable template for creating projects. In at least one embodiment, project profiles define settings such as a web-service account or virtual private cloud (VPC) in which projects are deployed.

In at least one embodiment, a project has capabilities that represent a set of prepared stacks of deployment and configuration parameters that can be launched during project creation. This allows one or more project capabilities to be enabled with a project profile and enables creation of the project. The project capabilities that are enabled in a project define or describe tools and services that may be members of the project so that they can be used to work with the data assets in the catalog 114 using the computer-coded policies. In at least one embodiment, the data governance module 118 enables data consumers, producers, or policy administrators to simplify access governance through separation of the data domains (in support of data stewards), projects (in support of data consumers), and subscription approvals (in support of data producers). Data producers may share data assets to fulfill data consumers' requests for data access to the underlying data from producers 108. In at least one embodiment, a policy administrator 126 may be a separate or a same entity as a data consumer or a data producer to limit, by computer-coded policy, a lifecycle of the data assets shared there between. The policy administrator 126 may provide or associate the computer-coded policy to a policy interface 124 via an admin or administrator interface 126.

In at least one embodiment, a data plane interface 120 allows for enforcement and monitoring that is associated with the data assets and at least one computer-coded policy, of the policy interface 124, to which the data assets are subjected. For example, the data plane interface 120 coordinates with the data governance module 118 to provide monitoring for the one or more data assets. The monitoring is to ensure that the one or more data assets is in accordance with the computer-coded policy. Further the coordination between the data plane interface 120 and the data governance module 118 is to perform a remediation action associated with the one or more data assets in response to a violation associated with the computer-coded policy. For example, the remediation action may be to the metadata or configuration of an environment of the data asset. In at least one embodiment, the configuration of the environment includes access control changes to availability of underlying data and to change sovereignty associated with the underlying data. Separately, the admin or administrator interface 126 may be a standalone or browser-based web application to support different users, including the webservice customer 222, the data owner 218, the policy administrator 126, and the compliance reporter 224. For example, the users may be able to access a catalog, discover data assets, govern the data assets, share the data assets and computer-coded policies, and analyze data in a self-service manner. In at least one embodiment, the admin or administrator interface 126 authenticates users with credentials from an identity provider.

Figure 2:
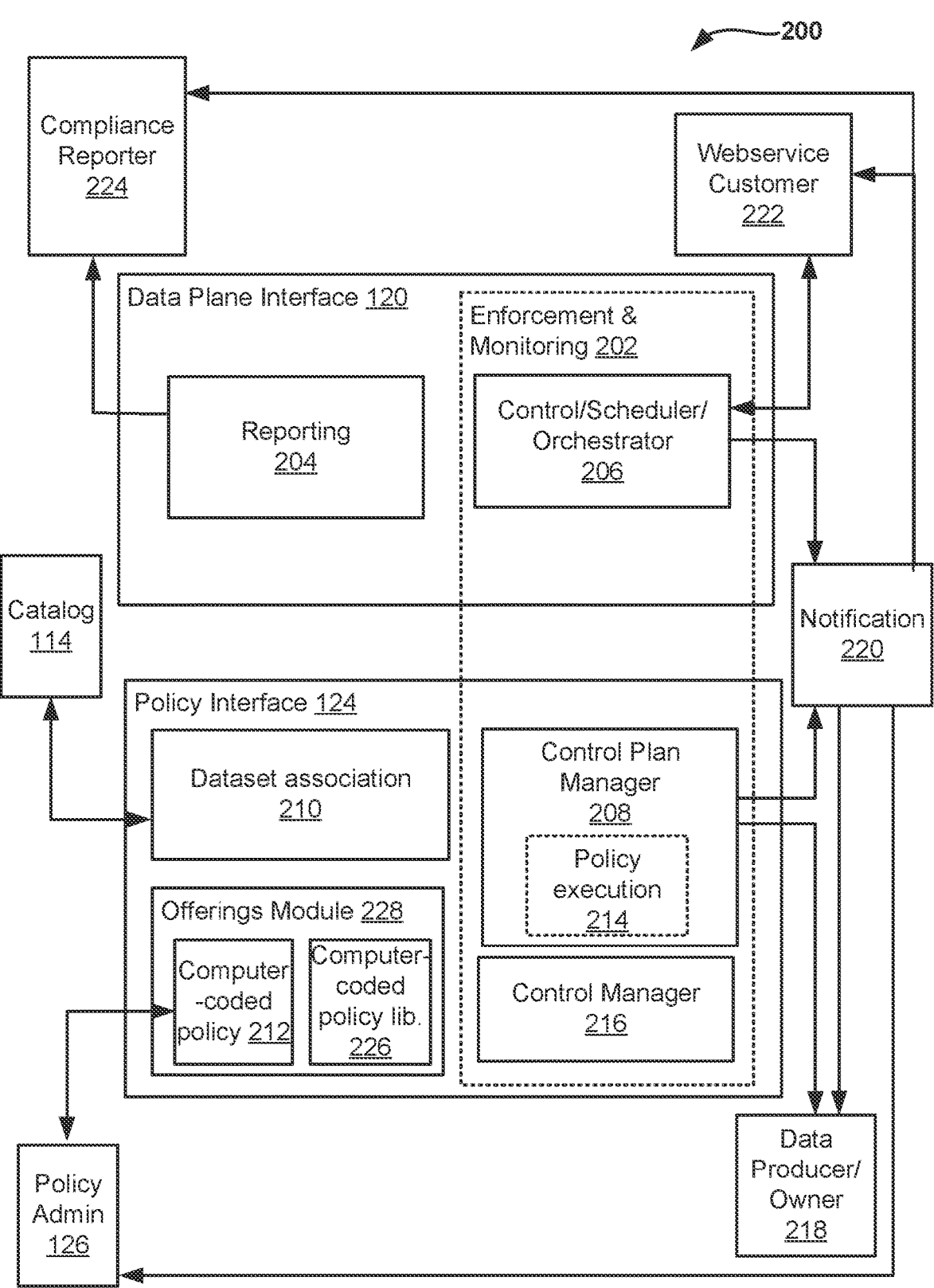
FIG. 2 illustrates a block diagram of interface details in a system for a remediation action in response to a violation associated with a computer-coded policy, in accordance with at least one embodiment.

FIG. 2 illustrates a block diagram 200 of interface details in a system for a remediation action in response to a violation associated with a computer-coded policy, in accordance with at least one embodiment. The interface details in FIG. 2 pertains to at least the data plane interface 120 and the policy interface 124 of the system in FIG. 1, for instance. In at least one embodiment, the system in the block diagram 200 includes at least one processor and memory storing instructions that when executed by the at least one processor causes the system to perform the interface details herein. The system can receive a computer-coded policy 212 from a policy administrator 126. In at least one embodiment, there may be policy templates in a computer-coded policy library 226 or in a dataset association module 210 that may be modified to suit a data asset. A policy administrator 126 can author a computer-coded policy, which can be automatically associated with a computing resources and/or a data asset.

In at least one embodiment, testing may be performed, in the form of executable code to test against the computer-coded policies in a test environment, prior to deploying a published version of the computer-coded policy 212. However, the tests may also be part of the enforcement and compliance in a live environment where the computer-coded policies are published and deployed. As part of the testing, test parameters may be provided or generated, for the computer-coded policy 212, for testing purposes. A control, scheduling, and orchestration module 206 is adapted to perform the testing. For example, this module can invoke customer-defined tests and actions as applied to at least one computer-coded policy and its associated data asset, in the test environment. The control, scheduling, and orchestration module 206 can also monitor and remediate identified issues prior to publishing the computer-coded policy 212 to the live environment, for instance. The tests may include test parameters that define one or more compliance thresholds for the one or more data assets. Then, a plurality of remediation actions can be generated or provided in the control, scheduling, and orchestration module 206 for the one or more data assets. For example, at least one of the remediation actions may be performed for the one or more data assets and may be based upon the at least one of the one or more compliance thresholds being breached.

In at least one embodiment, a computer-coded policy 212 can be authored using a Cedar® policy coding. Cedar® provides verified permissions coding, which is scalable and which includes fine-grained permissions management and authorization for custom applications. Verified permissions coding pertains to authorization by verifying whether a policy administrator 126 is allowed to perform an action on a resource for an application and in a given context. As such, verified permissions coding presumes that the policy administrator 126 has been identified and authenticated any authentication solution associated with the cloud environment 102. Further, verified permissions coding ensure that the computer-coded policy is agnostic to at least the type of authentication used.

In at least one embodiment, verified permission coding enables developers to build secure applications faster by externalizing authorization and centralizing policy management and administration. The verified permissions coding aspect that is used in Cedar® allows for definitions of fine-grained permissions for policy administrators, application users, or other consumers of the data from producers 108. For example, a computer-coded policy 212 for a data asset is provided to ensure that only authorized users can access the data set or the computer-coded policy 212. Further, the authorization may be also to ensure that a policy administrator is limited to certain policy capabilities. Cedar® decouples business logic from policy logic so that the policy may include prefaced requests made to a Cedar® authorization engine to first verify that the policy and aspects associated there with are authorized. Then, the computer-coded policy may be provided, as instructions having a set of pre-determined rules from policy parameters coded therein, to a dataset association module 210 that can cause the policy to be enforced for an underlying dataset. For example, the pre-determined rules and identification to an associated dataset, such as using a principal or resource (as detailed with respect to Table 1), is provided to a catalog 114. The catalog 114 may include a data asset having annotations 116A, of the underlying data from producers 108, which become subject to one or more policy parameters 128 of the computer-coded policy 212.

In at least one embodiment, the computer-coded policy 212 may be consumed via a software development toolkit (also referred to as a policy execution module 214). In at least one embodiment, an offerings module 228 provides an abstraction layer, which is provided as an intuitive user interface within the offerings module 228 to support authoring of the computer-coded policies 212. Separately, the policy execution module 214 allows for execution of a computer-coded policy 212 in a control plane that is associated with a cloud environment. Instructions may be generated by the policy execution module 214 based in part on the execution of the computer-coded policy in the control plane.

In an example, a computer-coded policy 212 may be associated with data governance module 118 in a data plane using one or more data assets of the cloud environment. Data governance, as used herein, is associated at least people, processes, and technologies required to meet an entity's data strategy, such as defined in part by a data lifecycle management and data policy curation. While these are a subset of capabilities which an entity may undertake within data governance, there may be other capabilities as part of a broader data governance implementation to ensure that the computer-coded policy can at least address one or more of the entity's data strategy. As part of the data lifecycle management, the instructions from the policy execution module 214 may be used to perform a modification in the annotations 116A of a data asset to enforce the remediation action associated with the one or more data assets.

In at least one embodiment, data producers can natively publish structured data assets (such as, in XML®, JSON®, CSV, or other formats). These data assets are published to the catalog from their data from producers 108. For example, a retention table may be used to ingest the data into their respective catalog from sources of the data producers. Then data consumers can access their data assets using a retention table, for instance. One or more of the data producers, the data consumers, a webservice customer, or a policy administrator can manage permissions for the retention tables. When computer-coded policies are defined at a metadata layer, tests and remediation actions may be used to implement the underlying policy parameters on the data itself, in a data resource associated with the data asset at issue. Therefore, as along as data assets are curated with metadata, policy and guidelines may be defined to work on the data assets, as detailed further in the subsequent aspects herein.

While described with respect to Cedar®, in at least one embodiment, a data producer or consumer need not author computer-coded policies in Cedar® but may use other policy languages, such as Rego®. In at least one embodiment, the policy interface 124 also addresses privacy and data challenges by automated policy attachment to business and other metadata and by continuous policy testing directed towards the computer-coded policies. Therefore, it is possible to automatically associate the one or more data assets to the computer-coded policy. For example, pre-determined rules associated with the computer-coded policy and annotations associated with the one or more data assets may be used to make such associations. As a result of such associations, in a dataset association module 210, it is possible to cause one or more dynamic changes to be performed with respect to the annotations of the one or more data assets based in part on real-time changes to the computer-coded policy.

In at least one embodiment, customers/data owners or policy administrators 222; 218; 126 may use logical expressions, based on business glossary, to set a match rule of the pre-determined rules associated with the computer-coded policy. This may be performed using the computer-coded policy module 212 or the computer-coded policy library 226. In one example of a computer-coded policy, as provided in Table 1, a match rule of the computer-coded policy may include a "Purpose is Provide_Ongoing_Service" statement, where "Purpose" may be a business glossary expression, and where "Provide_Ongoing_Service" may be a child of the "Purpose" expression to indicate that "Personal Data" is associated with the service that is to be retained when the service is "ongoing." An example computer-coded policy may be provided for each entry in a retention period table and may be provided from a computer-coded policy template in a computer-coded policies library. Such a computer-coded policy may include business glossary to define the match rules and may include, additionally, relevant retention periods as policy parameters of each policy.

TABLE 1

```
permit(principal, action, resource)
when {
resource has Privacy.TTL && TTL > 30 days &&
resource has Privacy.Purpose && Privacy.Purpose ==
Privacy.Purpose.Product_Improvement && resource has
Personal Data.Pseudonymized
}
advice {
retentionPeriod: 2.5y
}
permit(principal, action, resource)
when {
resource has Privacy.TTL && TTL > 30 days &&
resource has Privacy.Purpose && Privacy.Purpose ==
Privacy.Purpose.Product_Improvement && not resource
has Personal Data.Pseudonymized
}
advice {
retentionPeriod: 3mo
}
```

On the data asset side, an application may include a policy having multiple "Purposes," multiple data subjects (such as, children and different age groups), and multiple data states (pseudonymized or not). Other than "ongoing" service as a "Purpose," product improvement, personalizing, marketing, security, and litigation may be other purposes. One or more of such "Purposes," data subjects, and data states may be associated with a business glossary and may, therefore, be provided in an annotation template to guide generation and/or population of a data asset.

The policy execution module 214 can manage missing data errors, can add fully qualified namespaces, and can create the computer-coded policy written in a syntax of Cedar® or other policy language. When the computer-coded policy, such as in Table 1, is executed, the "Purpose" expression may be used to determine data assets using the annotations of the data asset. For example, the "Purpose" expression may be split into two policy parameters (one for pseudonymized, one for not using syntax statements). The "action" argument of the example computer-coded policy is in reference to a remediation action. The example computer-coded policy in Table 1 is able to extract those data assets having "Purpose" of "product improvement" as described in its corresponding annotations (which may also include semantic variations). Then, the computer-coded policy's pre-determined rules, such as retention rules (coded as policy parameters 2.5 years or 3 months) and deletion rules (outside of the years and months expressly included for retention) are automatically associated to those extracted data assets so that compliance to those policy parameters is ensured.

Further, a two-way review of compliance and enforcement by the computer-coded policy or the one or more data assets is enabled herein. For instance, on the one hand, dynamic changes to the one or more data assets are allowed, where real-time changes to the computer-coded policy may change a retention rule or a deletion rule, and which, in turn, causes the dynamic changes to the one or more data assets to apply the new retention rules, deletion rules, data filtering rules, data disclosure rules (including data subject access requests), data sovereignty rules, or locality rules to contents therein. In addition, on the other hand, the one or more data assets are monitored in accordance with the computer-coded policy and, when a violation associated with the computer-coded policy is determined, a remediation action may be performed for the one or more data assets in response to a violation. Therefore, it is not only the case that dynamic changes are allowed to the data assets so that they comply with changes to the computer-coded policy, but also there is continued monitoring of the data assets to ensure the compliance whether or not a change occurs in real-time to a computer-coded policy.

In one example, an enforcement and monitoring module 202 may span a data plane and a control plane with sub-modules for control, scheduling, and orchestration module 206, for a control plan manger module 208, and for a control manager module 216, to provide such monitoring and dynamic changes to the one or more data assets. Then, when a determination can be made that a change has occurred to a computer-coded policy, such as new policy parameters being added or existing policy parameters being deleted, a change may be performed also to the one or more data assets, such as to delete, to retain, to filtering, disclose (including by providing access), to subject to data sovereignty, or to subject to locality rules, contents of a data asset, based in part on the new policy parameters. At least the deletion may be taken as a remediation action for information associated with the one or more data assets in response to a violation associated with the computer-coded policy.

In at least one embodiment, the enforcement and monitoring module 202 can monitor contents of the one or more data assets in accordance with the computer-coded policy and can perform a remediation action associated with the one or more data assets in response to a violation associated with the computer-coded policy. In one example, a policy administrator 126 can author a computer-coded policy 212 by providing pre-determined rules and semantic descriptions of the types of data to which it will be applied. The types of data may include geography, line of business, and business uses for which such data is discovered. The semantic descriptions may be associated with semantic variations of the types of data so that a literal match is not a requisite using the pre-determined rules herein.

The pre-determined rules may also include match rules that are based in part on the semantic descriptions to discover data assets 116 to which the computer-coded policy, as authored, should apply. Therefore, the policy interface 124 can enable definition of a policy type and match rules to be part of the computer-coded policy. Then, using a semantic sub-system of the dataset association module 210, a determination can be made as to the one or more data assets associated with the policy type and the match rules. The data assets may be made available, to the dataset association module 210, from the catalog 114. In at least one embodiment, the computer-coded policies at least include a match rule and a compliance threshold to support different tests and remediation actions for data assets to measure and meet the compliance thresholds.

There may be further pre-determined rules that describe that the data must adhere to a maximum age and to set parameters, including to retention schedules. There may be executable code associated with the computer-coded policy but distinct from the policy interface, which can measure adherence to these rules. For example, the control, scheduling, and orchestration module 206 can perform monitoring for the violations and can perform monitoring for changes to the computer-coded policies so that dynamic changes may be ensured to the one or more data assets.

In one example, policy state changes, based in part on changes to the computer-coded policy 212 may be passed to the control manger module 216 that may cause a notification to be performed by the notification module 220 to one or more of the customers/data owners 222, 218 or policy administrators 126. Similarly, changes in the association between a computer-coded policy and a data asset may be similarly passed to the control manger module 216, from the dataset association module 210 so that a notification module 220 can notify one or more of the customers/data owners 222, 218 or policy administrators 126. In addition, these updates or changes may be passed to the control, scheduling, and orchestration module 206 to cause the reporting module 204 to report compliance changes and to allow for monitoring of the update or changes for compliance threshold violations. The control, scheduling, and orchestration module 206 allows for scheduled control runs to be performed for checking for compliance with input from a webservice customer 222.

In at least one embodiment, when it is determined to use a specific catalog 114 for data from producers 108 of an entity, users associated with the entity can publish data assets and can enrich them with business context. The users can also securely share analytics, data science, or machine-learning associated with the data from producers 108. Further, data governance from a provided data governance module 118 is provided with specific privacy requirements to apply to the data from producers 108 for the entity. Based at least in part on regulations, contracts, and other directives, a basis to govern data from producers 108 throughout its lifecycle, may include consideration to what data from producers 108 is collected, where and how data from producers 108 is stored, how it is used, and to ensure that the data from producers 108 is properly retained or deleted.

In at least one embodiment, an entity may have a default retention policy that requires all of its subscribers to only use data collected in the last 30 days unless the data is intended for purposes of product diagnostics. Therefore, a computer-coded policy may be required to delete data that is older than 30 days. Computer-coded policies may be authored for data handling and are defined by the data governance or privacy aspects associated with the data. A data producer or publisher need not understand how a computer-coded policy might apply to a data asset and need not search through thousands of datasets to discover relationships. Instead, metadata forms are used to collect the data governance or privacy aspects for an entity. Data producers or publishers can include annotations to their data assets using these metadata forms. Then computer-coded policies can include criteria for a policy execution module 214 to discover relationships between the computer-coded policies and the data assets by, in part, executing the computer-coded policies that allow for automatic association of the one or more data assets to the computer-coded policy using the pre-determined rules associated with the computer-coded policy and using the annotations associated with the one or more data assets.

In one example, the computer-coded policy includes policy parameters, such as retention periods and deletion schedules. A policy administrator 126 can also define guidelines within the computer-coded policies for how specific ones of the computer-coded policies should be implemented. Separately, data producers or publishers can use these guidelines and prepare computer-code for compliance monitoring and to perform remediation actions that can be invoked if the data assets become non-compliant with the policy parameters of the computer-coded policy. In an example, a data consumer or subscriber working with data in a cloud storage and having access to structure query language (SQL) may provide the data to be cataloged to a catalog 114.

To implement a default retention policy, a computer-coded policy may be authored stating the retention period of 30 days. The computer-coded policy may include a pre-determined rule that sets a match rule to all data assets that are not annotated with a usage purpose of product diagnostics, as in the aforementioned example. The policy execution module 214 can perform the match rule to determine which data assets are in-scope for the policy. The data producers or publishers can also author further tests and actions prior to published computer-coded policies. For example, the data producers or publishers can prepare computer-coded remediation actions that reads a storage object of a data asset, that checks a collection date of each row for age, that deletes data if greater than 30 days, and that creates new data objects. In at least one embodiment, the policy execution module 214 can also automatically detect conflict, both within a computer-coded policy and across different computer-coded policies using the policy parameters therein. A report may be generated that calls out more than one policy parameter for retention with a same match rules of the pre-determined rules, in one example. The conflict must be resolved before authoring and activation can continue.

Further, the data producers or publishers can prepare computer-coded remediation actions for a further action in the form of an SQL script which deletes rows older than 30 days for impacted tables forming the data asset. Still further, the data producers or publishers can prepare computer-coded testing that checks for existence of data for longer than 30 days in the data objects and the data assets. In at least one embodiment, a data consumer or subscriber can attach the computer-coded tests and computer-coded actions to their working copies. In at least one embodiment, a notification module 220 sends notifications to an account for a policy administrator 126, a compliance reporter 224, a webservice customer 222, or a data owner 218. The notifications may trigger remediation actions at a schedule configured by any of the policy administrator 126, a compliance reporter 224, a webservice customer 222, or a data owner 218 using the control, scheduling, and orchestration module 206.

Alternatively, a data publisher can leverage sample functional workflows to trigger a workflow that causes the one or more of the automation to the policy interface for generation of computer-coded policies, for monitoring, and for dynamic changes to be performed to data assets, as described throughout herein. The policy-as-code capabilities herein automates policy enforcement and reduces operational overhead for users, such as for data publishers. As customers add, remove, and update data assets, it is possible to automatically match computer-coded policies to data assets using policy parameters defined therein and using annotations in the data assets. Then, the system starts monitoring for policy compliance and publishes reports and underlying data as new data assets may be included in a catalog 114. The system can provide such reports using a reporting module 204 to enable policy administrators to consume and perform additional analysis.

In at least one embodiment, once association of data assets to a computer-coded policy is performed, the guidelines to implement the computer-code policy may be described in a control plan manager module 208 and may be administered by a control manager module 216. The guidelines is in the form of a control plan to be stored in the control plan manager module 208. The control plan may be envisioned as a functional contract that defines how to implement a data handling requirement (such as, retention) according to a regulation, a commercial contract, or a company policy. Within a control plan, a coded syntax declaration may be provided for an intent that pertains to what a policy in intended to do; for tests and actions that pertain to how the intention in the policy is performed; whether or not the control plan applies when policy is running in active and/or shadow states; and frequencies to run the tests and actions. A computer-coded policy may be associated with match rules and a control plan prior to activation. Then, data producers or publishers may receive notifications from the notification of events and tasks that relate to computer-coded policies.

In an example, the events and tasks may be caused as part of other actions by the control, scheduling, and orchestration module 206. The tasks may indicate that a governance policy for retention has been activated for a data domain and, specifically, for a data asset under control of an entity in the cloud environment. The tasks may also include indication for a requirement to register controls (such as, tests or actions) for execution of a computer-coded policy, such as a retention policy. A policy administrator may be able to review associations of a computer-coded policy to a data assets based in part on annotation in a catalog, as well as based in part on reports from an author of the computer-coded policy. The policy administrator may, in part, manage policy controls and control plans using a control plan manager module 208 and a control manager module 216, and may associate control plans to a computer-coded policy.

In at least one embodiment, different policy states may be provided as part of a policy parameter for a computer-coded policy. One or more of a policy administrator, a data producer (or owner), or a data consumer may be able to set a trigger that can be published to run a control plan at a scheduled time in coordination between the control, scheduling, and orchestration module 206, the control plan manager module 208, and a control manager module 216. Further, a result can be written back to reporting module 204. Control blueprints may be provided to simplify the receipt of the trigger notifications to run controls, to secure control parameters, and to write a completion status to the reporting module 204.

Figure 3:
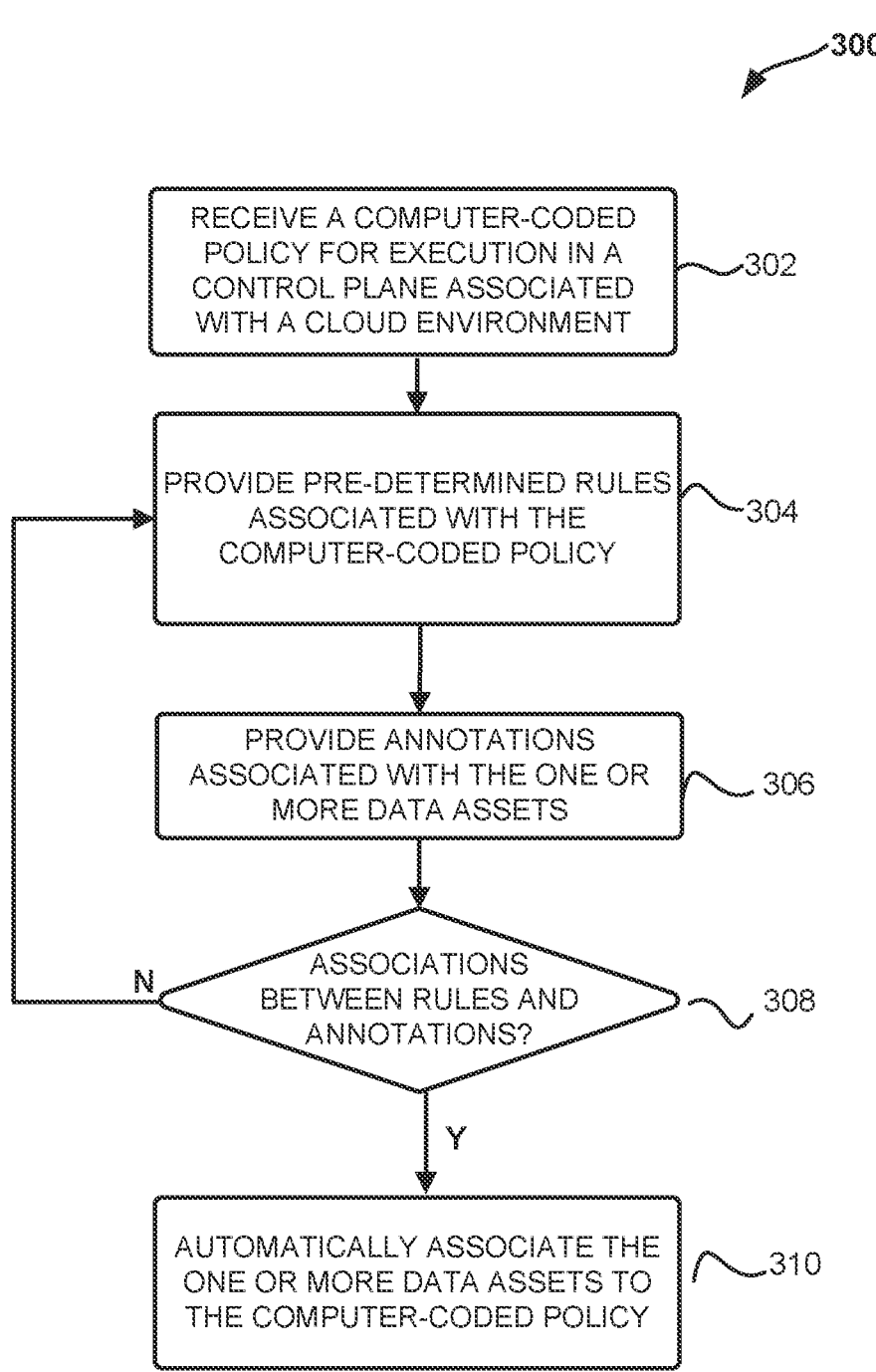
FIG. 3 illustrates a process flow or method used for a system for a remediation action in response to a violation associated with a computer-coded policy, in accordance with at least one embodiment.

FIG. 3 illustrates a process flow or method 300 used for a remediation action in response to a violation associated with a computer-coded policy, in accordance with at least one embodiment. One or more steps in the method 300 may be performed on a client device or using a client device together with a cloud environment that is remote from the client device, as illustrated and described with respect to FIGS. 5-7. The method 300 includes receiving 302 a computer-coded policy for data governance using one or more data assets within a cloud environment. For example, the method includes using an admin interface to receive a computer-coded policy from a policy administrator or using policy templates in a computer-coded policy library or in a dataset association module that may be modified to suit a data asset. A policy administrator 126 can author a computer-coded policy using the policy templates, in one example.

The method 300 includes providing 304 pre-determined rules associated with the computer-coded policy. For example, a computer-coded policy's policy parameters (as in, Table 1) are used to provide pre-determined rules, such as retention rules and deletion rules, by execution of the computer-coded policy. A further step in the method includes providing 306 annotations associated with the one or more data assets. A further step includes determining or verifying 308 associations between the pre-determined rules and the annotations. For example, an application associated with a data asset may include a policy having multiple "Purposes," having multiple data subjects, and having multiple data states and one or more of such "Purposes," data subjects, and data states may be associated with a business glossary and may, therefore, be provided in an annotation template to guide generation and/or population of a data asset.

The method 300 includes automatically associating 310 the one or more data assets to the computer-coded policy using one or more data assets to the computer-coded policy. For example, a computer-coded policy (as in Table 1) is able to extract data assets having "Purpose" of "product improvement" as described in its corresponding annotations (which may also include semantic variations). Then, the computer-coded policy's pre-determined rules, such as retention rules (provided in the policy as policy parameters of 2.5 years or 3 months) and deletion rules (outside of the years and months expressly included for retention) are automatic associated to those extracted data assets.

Figure 4:
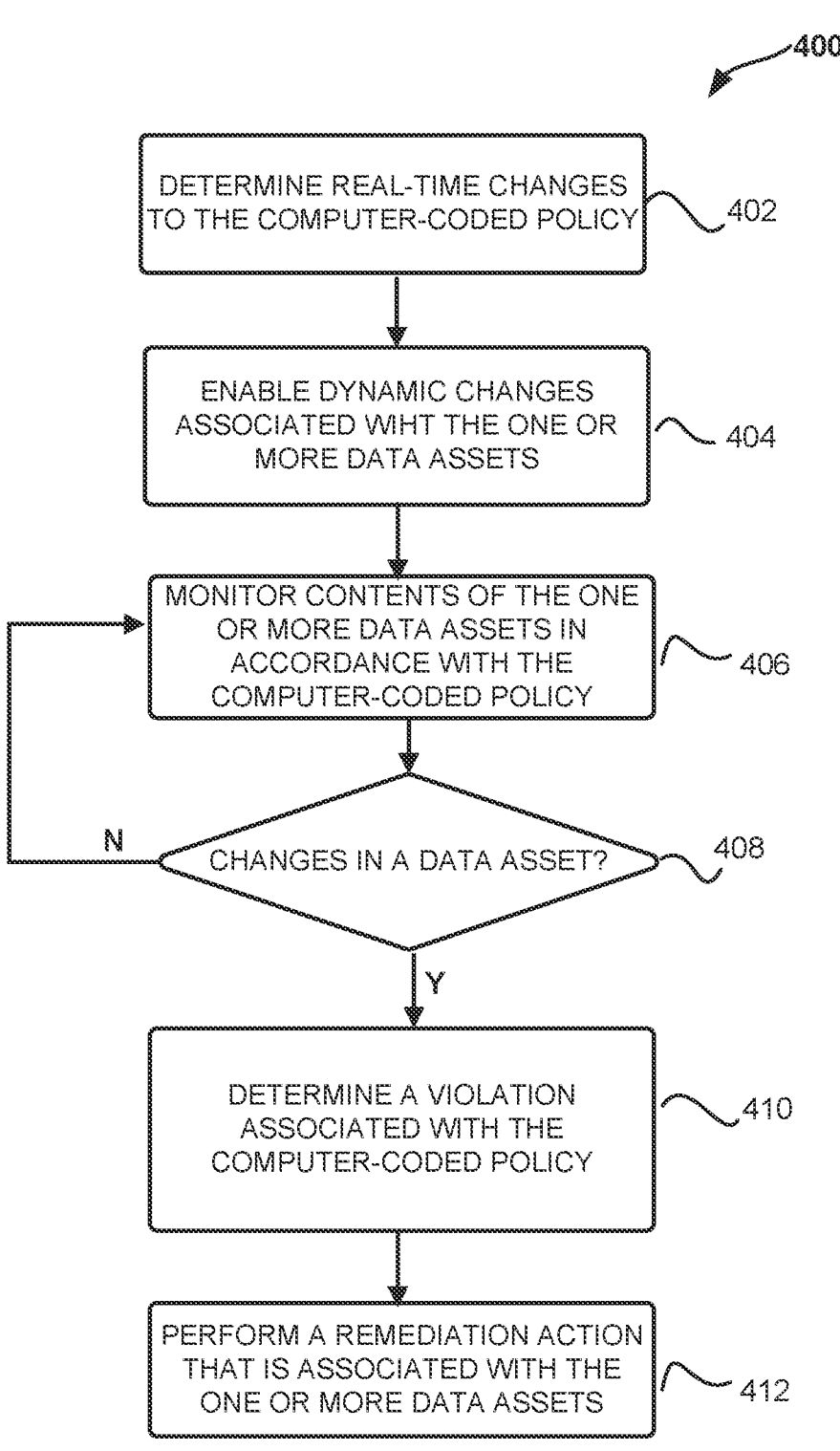
FIG. 4 illustrates another process flow or method used for a system for a remediation action in response to a violation associated with a computer-coded policy, in accordance with at least one embodiment.

FIG. 4 illustrates another process flow or method 400 used for a system for a remediation action in response to a violation associated with a computer-coded policy, in accordance with at least one embodiment. One or more steps in the method 400 may be performed on a client device or using a client device together with a cloud environment that is remote from the client device, as illustrated and described with respect to FIGS. 5-7. The method 400 may be performed subsequent to the method 300 of FIG. 3. In at least one embodiment, the method 400 includes determining 402 real-time changes to the computer-coded policy. For example, if the computer-coded policy is changed to include different deletion or retention rules, this causes the method 400 to enable 404 dynamic changes associated with the one or more data assets, such as to cause dynamic changes to be performed with respect to the annotations based in part on real-time changes to the computer-coded policy.

The method 400 includes monitoring 406 contents of the one or more data assets in accordance with the computer-coded policy as part of a two-way review of compliance and enforcement. Like changes to a computer-code policy, changes may also occur to a data asset and step 406 monitors for such changes. A verification 408 may be performed for an outcome of monitoring 406 step, such as, that the monitoring 406 step indicates a change in one or more date assets independent of the real-time changes to the computer-coded policy. The method 400 includes determining 410 that a violation associated with a computer-coded policy has occurred by the one or more data assets as a result of the change in the data assets indicated in step 408.

The method 400 includes performing 412 a remediation action that is associated with the one or more data assets in response to the violation associated with the computer-coded policy. For example, when a determination can be made, following the monitoring 406 step, that a change has occurred to a computer-coded policy, such as new policy parameters being added or existing policy parameters being deleted, which requires a change associated with a data asset or some information therein. A change may be performed to the one or more data assets, such as to metadata or configuration of an environment of the data asset. In at least one embodiment, the configuration of the environment includes access control changes to availability of underlying data and to change sovereignty configuration associated with the underlying data, based in part on the new policy parameters. Then, the contents of the data assets may be further monitored for changes with respect to the new policy parameters. At least a further remediation action may be performed that is associated with the one or more data assets in response to a violation associated with the new policy parameters of the computer-coded policy.

In at least one embodiment, the method 400 is a computer-implemented method that includes a further step or includes a sub-step for the computer-coded policy to include policy parameters associated with at least retention rules and deletion rules. In at least one embodiment, the method 400 a further step or includes a sub-step for providing an interface to enable definition of a policy type and match rules to be part of the computer-coded policy. Further, the method 400 includes a further step or includes a sub-step for determining, using a semantic sub-system, the one or more data assets associated with the policy type and the match rules.

In at least one embodiment, the method 400 is a computer-implemented method that includes a further step or includes a sub-step for providing test parameters for the computer-coded policy. The test parameters may define one or more compliance thresholds for the one or more data assets. The method 400 includes a further step or includes a sub-step for providing a remediation actions for the one or more data assets. At least one of the remediation actions may be performed for the one or more data assets and may be provided from the remediation actions that may be pre-defined and that may be based upon the at least one of the one or more compliance thresholds being breached.

In at least one embodiment, the method 400 is a computer-implemented method that includes a further step or includes a sub-step for generating instructions based in part on execution of the computer-coded policy in a control plane of the cloud environment. The method 400 includes a further step or includes a sub-step for performing a deletion or an addition in a retention table, based in part on the instructions, to enforce the remediation action associated with the one or more data assets. The method 400 includes a further step or includes a sub-step for the remediation action to be one of altering access controls to a data store of the one or more data assets or to perform soft-deletes or hard-deletes to expunge non-compliant data of the one or more data assets.

In at least one embodiment, the method 400 is a computer-implemented method that includes a further step or includes a sub-step for enabling, using an interface of a control plane, a preview action associated with the computer-coded policy. The computer-coded policy may be applied to a representation of the one or more data assets, such as to a table, a view, or a dashboard. The method 400 includes a further step or includes a sub-step for providing results associated with remediation actions or violations for the representation of the one or more data assets. The method 400 includes a further step or includes a sub-step for allowing publishing of the computer-coded policy to act against the one or more data assets.

In at least one embodiment, the method 400 is a computer-implemented method that includes a further step or includes a sub-step for enabling one or more of notifications to perform a scheduled or triggered testing of the computer-coded policy against a representation of the one or more data assets. Here, the representation may include infrastructure that built in a test portion of a cloud environment (also referred to as a test environment). The representation is to trigger actions, such as a testing action and a remediation action. Further, the representation is to enable the real-time changes to the computer-coded policy. In at least one embodiment, the method 400 is a computer-implemented method that includes a further step or includes a sub-step for the triggered testing to be based in part on a change in the one or more data assets during performance of a workload.

In at least one embodiment, such a method 300, 400 performed using one or more aspects in the systems in FIGS. 1 and 2 allow customers or administrators to create retention and deletion computer-coded policies within a cloud environment, where such computer-coded policies specify policy parameters such as retention rules and deletion rules, including deletion schedules. Such computer-coded policies also define match rules for policy coverage. Then, one or more of the policy interface 124 or the data plane interface 120 matches policies to data assets using policy coverage criteria or pre-determined rules incorporating the policy parameters and using annotations from the data assets. The customers or administrators can also define guidelines for how the policy will be tested for compliance, and the steps to take to remediate, if required. In one example, data publishers may use the guidelines to implement the tests and remediation steps as part of the computer-code policy.

Further, once the computer-code policies are activated, the enforcement and monitoring module 202 continually helps customers monitor their data environments for policy compliance and enables notifications and changes to user accounts for use of data assets. The notifications may include details of impacted data assets that can be configured or that are subject to change to take remediation actions. For example, such changes may include deleting data, masking data, or enforcing least privilege access. One or more of the policy interface 124 or the data plane interface 120 allows customers and administrators to set and enforce data handling rules regarding when and how data is retained or deleted. In at least one embodiment, while the computer-code policies are written using computer-coded policy library 226, a semantic layer may be added by a policy administrator to describe data assets of the catalog. Then, one or more of the policy interface 124 or the data plane interface 120 may use the semantic layer to enable policy administrators to write computer-coded policies, to discovery computer-coded policies and data asset associations, regardless of whether the data asset physically resides in a cloud environment.

In at least one embodiment, customers and administrators can monitor and enforce computer-coded policies with self-defined tests to check for problems and with remediation actions to correct any problems. Customers and administrators may manage their experience by linking existing computer-coded policies and have one or more of the policy interface 124 or the data plane interface 120 automatically invoke remediation actions on their behalf. Further, the automation herein allows remediation to policy findings based on notifications or signals. For example, it is possible to drop specific rows in a retention table to enforce retention. As such, one or more of the policy interface 124 or the data plane interface 120 uses the computer-coded policies to offer a uniform approach to data lifecycle management, spanning cloud, on-premises, and other offerings associated with the architecture in FIGS. 1 and 2.

Figure 5:
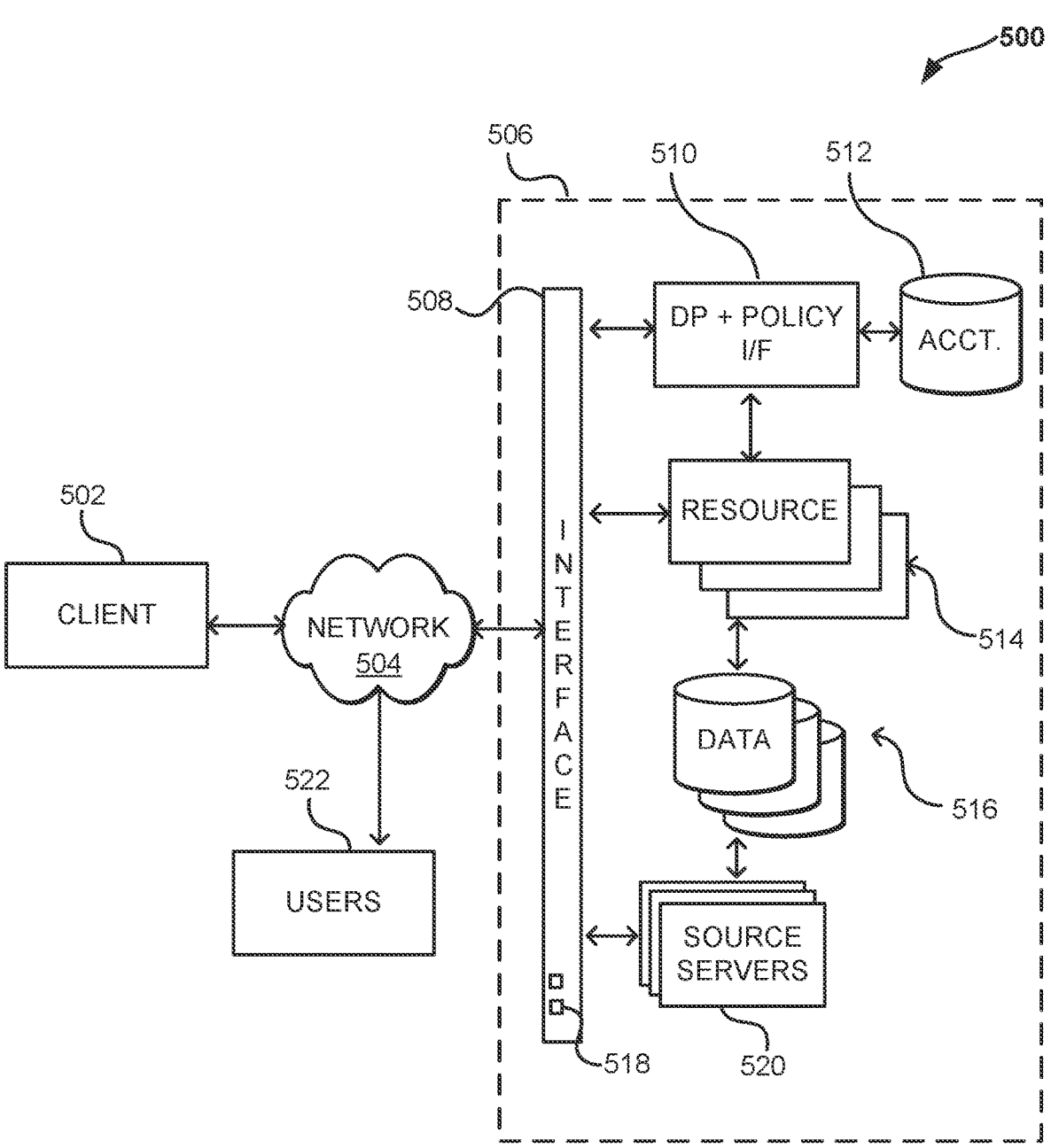
FIG. 5 illustrates an example network-inclusive computing environment in which aspects of various embodiments can be implemented.

FIG. 5 illustrates an example network-inclusive computing environment 500 in which aspects of various embodiments can be implemented. Such an environment can be used in some embodiments to provide source servers for one or more customers or administrators of a resource provider, as part of a shared or multi-tenant resource environment. Therefore, a network-inclusive computing environment 500 may be in different geographical locations to enable the policy interface 124 or the data plane interface 120 using one or more of such different geographical locations and the resources within their respective environments. For example, the provider environment 506 can be a cloud environment that can be used to provide cloud-based network connectivity for users, as may be used for the policy interface 124 or the data plane interface 120. The resources may also provide networking functionality for one or more client devices 502, such as personal computers, which may be able to connect to one or more networks 504 as discussed herein.

In this example a customer or administrator is able to utilize a client device 502 to submit requests across at least one network 504 to a service provider environment 506 that may include one or more of the policy interface or the data plane interface (DP+Policy I/F) 510. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 504 can include any appropriate network, including an intranet, the Internet, a cellular network, a local area network (LAN), or any other such network or combination, and communication over the network can be enabled via wired and/or wireless connections. The service provider environment 506 can include any appropriate components for receiving requests and returning information or performing actions in response to those requests. As an example, the service provider environment might include Web servers and/or application servers for receiving and processing requests, then returning data, Web pages, video, audio, or other such content or information in response to the request. The service provider environment can be secured such that only authorized users have permission to access those resources.

In various embodiments, a service provider environment 506 may include various types of resources that can be utilized by multiple users for a variety of different purposes. As used herein, computing, and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example, the service provider environment includes a plurality of resources 514 of one or more types. These types can include, for example, application servers operable to process instructions provided by a user or database servers operable to process data stored in one or more data stores 516 in response to a user request. As known for such purposes, a user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a customer or administrator wanting to utilize a portion of the resources 514 can submit a request that is received to an interface layer 508 of the service provider environment 506. The interface layer can include application programming interfaces (APIs) or other exposed interfaces 518 enabling a user to submit requests to the provider environment. The interface layer 508 in this example can also include other components as well, such as at least one Web server, routing components, load balancers, and the like. When a request to provision a resource is received to the interface layer 508, information for the request can be directed to a resource manager 514 or other such system, service, or component configured to manage customer accounts and information, resource provisioning and usage, and other such aspects. A resource manager 514 receiving the request can perform tasks such as to authenticate an identity of the customer or administrator submitting the request, as well as to determine whether there is an existing account with the resource provider, where the account data may be stored in at least one account 512 in the provider environment.

A customer or administrator can provide any of various types of credentials in order to authenticate an identity of the user to the provider. These credentials can include, for example, a username and password pair, biometric data, a digital signature, or other such information. The provider can validate this information against information stored for the customer or administrator. If a customer or administrator has an account with the appropriate permissions, status, etc., the resource manager can determine whether there are adequate resources available to suit the administrator's request, and if so, can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the customer or administrator does not have a valid account with the provider, the account does not enable access to the type of resources specified in the request, or another such reason is preventing the customer or administrator from obtaining access to such resources, a communication can be sent to the customer or administrator to enable the user to create or modify an account, or change the resources specified in the request, among other such options.

In at least one embodiment, resources made available for use by a client device 502 can include servers and other resources 514, 520, each having at least one processor and memory. The memory includes instructions that when executed by the respective processors enable one or more of the modules and the stores in FIGS. 1, 2, described herein, to enable a remediation action in response to a violation associated with a computer-coded policy. The servers may be used to cause application programming interfaces (API) calls to one or more other modules of the service provider environment 506 or to perform one or more functions associated with the remediation action in response to a violation associated with a computer-coded policy. The policy interface or the data plane interface (DP+Policy I/F) 510 may be unique to each customer or administrator account and may be accessed by the customer or administrator from a client device 502 using a command line interface (CLI) or a character user interface (GUI). The customer or administrator provides a service or an application for users (on respective host machines) 522 using one or more of the modules or stores in FIG. 1 or 2 and of the service provider environment 506.

Once a customer or administrator (or other requestor) is authenticated, the account verified, and the resources allocated, the customer or administrator can utilize the allocated resource(s) for the specified capacity, amount of data transfer, period of time, or other such value. In at least some embodiments, a customer or administrator might provide a session token or other such credentials with subsequent requests in order to enable those requests to be processed on that session. The customer or administrator can receive a resource identity, specific address, or other such information that can enable the client device 502 to communicate with an allocated resource without having to communicate with the resource manager 514, at least until such time as a relevant aspect of the account changes, the customer or administrator is no longer granted access to the resource, or another such aspect changes.

A policy interface or the data plane interface (DP+Policy I/F) 510 may include a control manager module 216 for certain control aspects in this example and can also support functions of a virtual layer of hardware and software components that handles control functions in addition to management actions, as may include provisioning, scaling, replication, policy enforcement, compliance, monitoring, remediation, etc. The policy interface or the data plane interface (DP+Policy I/F) 510 can utilize dedicated APIs in the interface layer 508, where each API can be provided to receive requests for at least one specific action to be performed with respect to the data environment, such as to provision, scale, clone, or hibernate, with respect to an instance, and to monitor, enforce, and remediate, with respect to computer-coded policies. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 508 in at least one embodiment includes a scalable set of user-facing servers that can provide the various APIs and return the appropriate responses based on the API specifications. The interface layer also can include at least one API service layer that in one embodiment consists of stateless, replicated servers which process the externally facing user APIs. The interface layer can be responsible for Web service front end features such as authenticating users or administrators based on credentials, authorizing the users or administrators, throttling requests to the API servers, validating input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, administrators or users of the services provided herein. The servers of the Web services layer can be stateless and scaled horizontally as known in the art. API servers, as well as the persistent data store, can be spread across multiple data centers in a region, for example, such that the servers are resilient to single data center failures.

FIG. 6 illustrates an example resource stack 602 of virtual and physical resources 600 that can be utilized in accordance with various embodiments, such as may be provided as part of a framework or environment to perform a remediation action in response to a violation associated with a computer-coded policy, such as illustrated in FIGS. 1 and 2. Tasks, such as policy enforcement, monitoring, and compliance tasks, for a catalog as an application 632, for example, may be performed using a hypervisor 618 and performed for one or more instances 620, 622 of the hypervisor 618. The resource stack 602 includes physical underlying resources, such as central processing units (CPUs) 612 for executing code to perform these tasks, network interface card (NIC) 606 for communicating network traffic, and memory for storing instructions and networking data. In some embodiments, an entire machine may be allocated for these tasks, or only a portion of the machine, such as to allocate a portion of the resources as a virtual resource in an instance 620; 622 that can perform at least some of these tasks.

Such a resource stack 602 can be used to provide an allocated environment for an administrator (or customer of a resource provider) having an operating system provisioned on the resource. In accordance with the illustrated embodiment, the resource stack 602 includes a number of hardware resources 604, such as one or more CPUs 612; solid state drives (SSDs) or other storage devices 610; a NIC 606, one or more peripheral devices (e.g., a graphics processing unit (GPU), etc.) 608, a BIOS implemented in flash memory 616, a baseboard management controller (BMC) 614, and the like.

In at least one embodiment, the hardware resources 604 reside on a single computing device (e.g., chassis). In at least one embodiment, the hardware resources can reside on multiple devices, racks, chassis, and the like. Running on top of the hardware resources 604, a virtual resource stack may include a virtualization layer such as hypervisor 618, a first instance 620, and potentially also a second instance 622 capable of executing at least one application 632. The hypervisor 618, if utilized for a virtualized environment, can manage execution of the one or more guest operating systems and allow multiple instances of different operating systems to share the underlying hardware resources 604.

An instance 620 or 622 can include one or more virtualized or para-virtualized drivers 630 and can include one or more backend device drivers 626. When the operating system (OS) kernel 628 of an instance wants to invoke an I/O operation, the virtualized or para-virtualized drivers 630 may perform the operation by way of communicating with the backend device driver 626. When the virtualized or para-virtualized drivers 630 wants to initiate an I/O operation (e.g., to send out a network packet), a kernel component can identify which physical memory buffer contains the packet (or other data) and the virtualized or para-virtualized drivers 630 can either copy the memory buffer to a temporary storage location in the kernel for performing I/O or obtain a set of pointers to the memory pages that contain the packet(s). In at least one embodiment, these locations or pointers are provided to the backend driver 626 of the host kernel 624 which can obtain access to the data and communicate it directly to the hardware device, such as the NIC 606 for sending the packet over the network.

It should be noted that the resource stack 602 illustrated in FIG. 6 is only one possible example of a set of resources that is capable of providing a virtualized computing environment and that the various embodiments described herein are not necessarily limited to this particular resource stack. In compute servers, a BMC 614 can maintain a list of events that have occurred in the system, referred to herein as a system event log (SEL). In at least one embodiment, the BMC 614 can receive system event logs from the BIOS 616 on the host processor. The BIOS 616 can provide data for system events over an appropriate interface, such as an I2C interface, to the BMC using an appropriate protocol, such as an SMBus System Interface (SSIF) or KCS interface over LPC. As mentioned, an example of a system event log event from BIOS includes an uncorrectable memory error, indicating a bad RAM stick. In at least some embodiments, system event logs recorded by BMCs on various resources can be used for purposes such as to monitor server health, including triggering manual replacement of parts or instance degrade when SELs from the BIOS indicate failure.

In at least one embodiment, there will be portions of the physical resources 600 that will be inaccessible to the OS. This can include, for example, at least a portion of BIOS 616. BIOS 616 in at least one embodiment is volatile memory such that any data stored to that memory will be lost in the event of a reboot or power down event. The BIOS may keep at least a portion of host memory unmapped, such that it is not discoverable by a host OS. Computing resources, such as servers, smartphones, or personal computers, will generally include at least a set of standard components configured for general purpose operation, although various proprietary components and configurations can be used as well within the scope of the various embodiments. As mentioned, this may include client devices for transmitting and receiving network communications, or servers for performing tasks such as network analysis and rerouting, among other such options.

FIG. 7 illustrates components of an example computing resource 700 that can be utilized in accordance with various embodiments. It should be understood that there can be many such compute resources and many such components provided in various arrangements, such as in a local network or across the Internet or "cloud," to provide compute resource capacity as discussed elsewhere herein. The computing resource 700 (e.g., a desktop or network server) will have one or more processors 702, such as central processing units (CPUs), graphics processing units (GPUs), and the like, that are electronically and/or communicatively coupled with various components using various buses, traces, and other such mechanisms.

A processor 702 can include memory registers 706 and cache memory 704 for holding instructions, data, and the like. In this example, a chipset 714, which can include a northbridge and southbridge in some embodiments, can work with the various system buses to connect the processor 702 to components such as system memory 716, in the form of physical RAM or ROM, which can include the code for the operating system as well as various other instructions and data utilized for operation of the computing device. The computing device can also contain, or communicate with, one or more storage devices 720, such as hard drives, flash drives, optical storage, and the like, for persisting data and instructions similar, or in addition to, those stored in the processor and memory.

The processor 702 can also communicate with various other components via the chipset 714 and an interface bus (or graphics bus, etc.), where those components can include communications devices 724, such as cellular modems or network cards, media components (graphics or audio card) 726, such as graphics cards and audio components, and peripheral interfaces 728 for connecting peripheral devices, such as printers, keyboards, and the like. At least one cooling fan 732 or other such temperature regulating or reduction component can also be included as well, which can be driven by the processor or triggered by various other sensors or components on, or remote from, the device. Various other or alternative components and configurations can be utilized as well as known in the art for computing devices.

At least one processor 702 can obtain data from system memory 716, such as a dynamic random access memory (DRAM) module, via a coherency fabric in some embodiments. It should be understood that various architectures can be utilized for such a computing device, which may include varying selections, numbers, and arguments of buses and bridges within the scope of the various embodiments. The data in memory may be managed and accessed by a memory controller, such as a DDR controller, through the coherency fabric. The data may be temporarily stored in a cache memory 704 in at least some embodiments. The computing resource 700 can also support multiple I/O devices using a set of I/O controllers connected via an I/O bus and also supported by a system clock 710. There may be I/O controllers to support respective types of I/O devices, such as a universal serial bus (USB) device, a data storage (e.g., flash or disk storage), a network card, a peripheral component interconnect express (PCIe) card or peripheral interface 728, a communication device 724, a graphics or audio card 726, and a direct memory access (DMA) card, among other such options. In some embodiments, components such as the processor, controllers, and caches can be configured on a single card, board, or chip (e.g., a system-on-chip implementation), while in other embodiments at least some of the components may be located in different locations, etc.

An operating system (OS) running on the processor 702 can help to manage the various devices that may be utilized to provide input to be processed. This can include, for example, utilizing relevant device drivers to enable interaction with various I/O devices, where those devices may relate to data storage, device communications, user interfaces, and the like. The various I/O devices will typically connect via various device ports and communicate with the processor and other device components over one or more buses. There can be specific types of buses that provide for communications according to specific protocols, as may include peripheral component interconnect) PCI or small computer system interface (SCSI) communications, among other such options. Communications can occur using registers associated with the respective ports, including registers such as data-in and data-out registers. Communications can also occur using memory mapped I/O, where a portion of the address space of a processor is mapped to a specific device, and data is written directly to, and from, that portion of the address space.

Such a device may be used, for example, as a server in a server farm or data warehouse. Server computers often have a need to perform tasks outside the environment of the CPU and main memory (e.g., RAM). For example, the server may need to communicate with external entities (e.g., other servers) or process data using an external processor (e.g., a General Purpose Graphical Processing Unit (GPGPU)). In such cases, the CPU may interface with one or more I/O devices. In some cases, these I/O devices may be special-purpose hardware designed to perform a specific role. For example, an Ethernet network interface controller (NIC) may be implemented as an application specific integrated circuit (ASIC) comprising digital logic operable to send and receive packets.

In an illustrative embodiment, a host computing device is associated with various hardware components, software components and respective configurations that facilitate the execution of I/O requests. One such component is an I/O adapter that inputs and/or outputs data along a communication channel. In one aspect, the I/O adapter device can communicate as a standard bridge component for facilitating access between various physical and emulated components and a communication channel. In another aspect, the I/O adapter device can include embedded microprocessors to allow the I/O adapter device to execute computer executable instructions related to the implementation of management functions or the management of one or more such management functions, or to execute other computer executable instructions related to the implementation of the I/O adapter device. In some embodiments, the I/O adapter device may be implemented using multiple discrete hardware elements, such as multiple cards or other devices.

A management controller can be configured in such a way to be electrically isolated from any other component in the host device other than the I/O adapter device. In some embodiments, the I/O adapter device is attached externally to the host device. In some embodiments, the I/O adapter device is internally integrated into the host device. Also, in communication with the I/O adapter device may be an external communication port component for establishing communication channels between the host device and one or more network-based services or other network-attached or direct-attached computing devices. Illustratively, the external communication port component can correspond to a network switch, sometimes known as a Top of Rack ("TOR") switch. The I/O adapter device can utilize the external communication port component to maintain communication channels between one or more services and the host device, such as health check services, financial services, and the like.

The I/O adapter device can also be in communication with a Basic Input/Output System (BIOS) component. The BIOS component can include non-transitory executable code, often referred to as firmware, which can be executed by one or more processors and used to cause components of the host device to initialize and identify system devices such as the video display card, keyboard and mouse, hard disk drive, optical disc drive and other hardware. The BIOS component can also include or locate boot loader software that will be utilized to boot the host device. For example, in one embodiment, the BIOS component can include executable code that, when executed by a processor, causes the host device to attempt to locate Preboot Execution Environment (PXE) boot software. Additionally, the BIOS component can include or takes the benefit of a hardware latch that is electrically controlled by the I/O adapter device. The hardware latch can restrict access to one or more aspects of the BIOS component, such controlling modifications or configurations of the executable code maintained in the BIOS component. The BIOS component can be connected to (or in communication with) a number of additional computing device resources components, such as processors, memory, and the like.

In one embodiment, such computing device resource components may be physical computing device resources in communication with other components via the communication channel. The communication channel can correspond to one or more communication buses, such as a shared bus (e.g., a front side bus, a memory bus), a point-to-point bus such as a PCI or PCI Express bus, etc., in which the components of the bare metal host device communicate. Other types of communication channels, communication media, communication buses or communication protocols (e.g., the Ethernet communication protocol) may also be utilized. Additionally, in other embodiments, one or more of the computing device resource components may be virtualized hardware components emulated by the host device. In such embodiments, the I/O adapter device can implement a management process in which a host device is configured with physical or emulated hardware components based on a variety of criteria. The computing device resource components may be in communication with the I/O adapter device via the communication channel. In addition, a communication channel may connect a PCI Express device to a CPU via a northbridge or host bridge, among other such options.

In communication with the I/O adapter device via the communication channel may be one or more controller components for managing hard drives or other forms of memory. An example of a controller component can be a SATA hard drive controller. Similar to the BIOS component, the controller components can include or take the benefit of a hardware latch that is electrically controlled by the I/O adapter device. The hardware latch can restrict access to one or more aspects of the controller component. Illustratively, the hardware latches may be controlled together or independently. For example, the I/O adapter device may selectively close a hardware latch for one or more components based on a trust level associated with a particular user. In another example, the I/O adapter device may selectively close a hardware latch for one or more components based on a trust level associated with an author or distributor of the executable code to be executed by the I/O adapter device. In a further example, the I/O adapter device may selectively close a hardware latch for one or more components based on a trust level associated with the component itself. The host device can also include additional components that are in communication with one or more of the illustrative components associated with the host device. Such components can include devices, such as one or more controllers in combination with one or more peripheral devices, such as hard disks or other storage devices. Additionally, the additional components of the host device can include another set of peripheral devices, such as Graphics Processing Units ("GPUs"). The peripheral devices and can also be associated with hardware latches for restricting access to one or more aspects of the component. As mentioned above, in one embodiment, the hardware latches may be controlled together or independently.

As discussed, different approaches can be implemented in various environments in accordance with the described embodiments. As will be appreciated, although a network- or Web-based environment is used for purposes of explanation in several examples presented herein, different environments may be used, as appropriate, to implement various embodiments. Such a system can include at least one electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like.

The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML, or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update, or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system can also include a number of workstations running any of a variety of commercially available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer, or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system comprising:
at least one processor; and
memory storing instructions that when executed by the at least one processor causes the system to:
    receive a computer-coded policy for execution in a control plane associated with a cloud environment, the computer-coded policy associated with data governance in a data plane using one or more data assets of the cloud environment;
    automatically associate the one or more data assets to the computer-coded policy using a set of pre-determined rules associated with the computer-coded policy and using annotations associated with the one or more data assets, the annotations comprising metadata describing the one or more data assets, the annotations being populated based on one or more parameters provided in an annotation template;
    cause one or more dynamic changes to be performed with respect to the annotations based in part on real-time changes to the computer-coded policy;
    monitor contents of the one or more data assets in accordance with the computer-coded policy; and
    perform a remediation action that is associated with the one or more data assets in response to a violation associated with the computer-coded policy.

2. The system of claim 1, wherein the computer-coded policy comprises policy parameters associated with one or more of retention rules, deletion rules, data filtering rules, data disclosure rules, data sovereignty rules, or locality rules.

3. The system of claim 1, wherein the memory storing the instructions that when executed by the at least one processor further causes the system to:
provide an interface to enable definition of a policy type and match rules to be part of the computer-coded policy, wherein the match rules are associated with a catalog and with the annotations to enable the system to perform the automatic association of the one or more data assets to the computer-coded policy associate policies; and
determine, using a semantic sub-system, the one or more data assets associated with the policy type and the match rules.

4. The system of claim 1, wherein the memory storing the instructions that when executed by the at least one processor further causes the system to:
provide test parameters for the computer-coded policy, the test parameters defining one or more compliance thresholds for the one or more data assets; and
provide a plurality of remediation actions for the one or more data assets, wherein the remediation action performed for the one or more data assets is provided from the plurality of remediation actions based upon the at least one of the one or more compliance thresholds being breached.

5. The system of claim 1, wherein the memory storing the instructions that when executed by the at least one processor further causes the system to:

generate instructions based in part on the execution of the computer-coded policy in the control plane; and perform a deletion or an addition in a retention table, based in part on the instructions, to enforce the remediation action that is associated with the one or more data assets.

6. The system of claim 1, wherein the remediation action is one of altering access controls to a data store of the one or more data assets or performing soft-deletes or hard-deletes to expunge non-compliant data of the one or more data assets.

7. A computer-implemented method comprising:

receiving a computer-coded policy for data governance using one or more data assets within a cloud environment;

automatically associating the one or more data assets to the computer-coded policy based at least in part on one or more pre-defined capabilities of the one or more data assets and using annotations associated with the one or more data assets, the annotations comprising metadata describing the one or more data assets, the annotations being populated based on one or more parameters provided in an annotation template;

enabling dynamic changes to add or remove a determined data asset of the one or more data assets; and performing a remediation action that is associated with the one or more data assets in response to a violation associated with the computer-coded policy.

8. The computer-implemented method of claim 7, wherein the computer-coded policy comprises policy parameters associated with one or more of retention rules, deletion rules, data filtering rules, data disclosure rules, data sovereignty rules, or locality rules.

9. The computer-implemented method of claim 7, further comprising:

providing an interface to enable definition of a policy type and match rules to be part of the computer-coded policy, wherein the match rules are associated with a catalog and with the annotations to perform the automatic association of the one or more data assets to the computer-coded policy associate policies; and determining, using a semantic sub-system, the one or more data assets associated with the policy type and the match rules.

10. The computer-implemented method of claim 7, further comprising:

providing test parameters for the computer-coded policy, the test parameters defining one or more compliance thresholds for the one or more data assets; and providing a plurality of remediation actions for the one or more data assets, wherein the remediation action performed for the one or more data assets is provided from the plurality of remediation actions based upon the at least one of the one or more compliance thresholds being breached.

11. The computer-implemented method of claim 7, further comprising:

generating instructions based in part on execution of the computer-coded policy in a control plane of the cloud environment; and performing a deletion or an addition in a retention table, based in part on the instructions, to enforce the remediation action that is associated with the one or more data assets.

12. The computer-implemented method of claim 7, wherein the remediation action is one of altering access controls to a data store of the one or more data assets or performing soft-deletes or hard-deletes to expunge non-compliant data of the one or more data assets.

13. The computer-implemented method of claim 7, further comprising:

enabling, using an interface of a control plane, a preview action associated with the computer-coded policy, wherein the computer-coded policy is applied to a representation of the one or more data assets;

providing results associated with remediation actions or violations for the representation of the one or more data assets; and allowing publishing of the computer-coded policy to act against the one or more data assets.

14. The computer-implemented method of claim 7, further comprising:

enabling one or more of notifications to perform a scheduled or triggered testing of the computer-coded policy against a representation of the one or more data assets, wherein the representation comprises infrastructure built in a test portion of a cloud environment to trigger testing and remediation actions therein and to enable real-time changes to the computer-coded policy.

15. The computer-implemented method of claim 14, wherein the triggered testing is based in part on a change in the one or more data assets during performance of a workload.

16. A non-transitory computer-storage medium storing instructions configured to instruct at least one computing device to:

receive a computer-coded policy for data governance using one or more data assets within a cloud environment;

automatically associate the one or more data assets to the computer-coded policy based at least in part on pre-defined capabilities of the one or more data assets and using annotations associated with the one or more data assets, the annotations comprising metadata describing the one or more data assets, the annotations being populated based on one or more parameters provided in an annotation template;

enable dynamic changes to add or remove determined data assets of the one or more data assets; and perform a remediation action that is associated with the one or more data assets in response to a violation associated with the computer-coded policy.

17. The non-transitory computer-storage medium of claim 16, wherein the instructions are configured to instruct at least one computing device further to:

provide an interface to enable definition of a policy type and match rules to be part of the computer-coded policy, wherein the match rules are associated with a catalog and with the annotations to perform the automatic association of the one or more data assets to the computer-coded policy associate policies; and determine, using a semantic sub-system, the one or more data assets associated with the policy type and the match rules.

18. The non-transitory computer-storage medium of claim 16, wherein the instructions are configured to instruct at least one computing device further to:

provide test parameters for the computer-coded policy, the test parameters defining one or more compliance thresholds for the one or more data assets; and provide a plurality of remediation actions for the one or more data assets, wherein the remediation action performed for the one or more data assets is provided from the plurality of remediation actions based upon the at least one of the one or more compliance thresholds being breached.

19. The non-transitory computer-storage medium of claim 16, wherein the instructions are configured to instruct at least one computing device further to:

generate instructions based in part on execution of the computer-coded policy in a control plane; and perform a deletion or an addition in a retention table, based in part on the instructions, to enforce the remediation action associated with the one or more data assets.

20. The non-transitory computer-storage medium of claim 16, wherein the instructions are configured to instruct at least one computing device further to:

enable, using an interface of a control plane, a preview action associated with the computer-coded policy, wherein the computer-coded policy is applied to a representation of the one or more data assets;

provide results associated with remediation actions or violations for the representation of the one or more data assets; and allow publishing of the computer-coded policy to act against the one or more data assets.

\*    \*    \*    \*    \*